United States Patent [19]

Ochiai

[11] Patent Number: 5,024,260
[45] Date of Patent: Jun. 18, 1991

[54] RADIAL TIRE FOR HEAVY DUTY VEHICLES

[75] Inventor: Kiyoshi Ochiai, Kobe, Japan

[73] Assignee: Sumitomo Rubber Industries, Ltd., Hyogo, Japan

[21] Appl. No.: 374,870

[22] Filed: Jul. 3, 1989

[30] Foreign Application Priority Data

Jul. 9, 1988 [JP] Japan .............................. 63-171125

[51] Int. Cl.[5] ............................................ B60C 11/08
[52] U.S. Cl. ............................................... 152/209 R
[58] Field of Search .......... 152/209 R, 209 D, DIG. 1

[56] References Cited

U.S. PATENT DOCUMENTS

| | | | |
|---|---|---|---|
| 4,345,632 | 8/1982 | Takigawa et al. | 152/209 X |
| 4,649,975 | 3/1987 | Kogure et al. | 152/209 R |
| 4,690,189 | 9/1987 | Bradisse et al. | 152/209 R |

FOREIGN PATENT DOCUMENTS

| | | | |
|---|---|---|---|
| 189608 | 9/1985 | Japan | 152/209 R |
| 903389 | 8/1962 | United Kingdom | 152/209 R |

Primary Examiner—Michael W. Ball
Assistant Examiner—Geoffrey L. Knable
Attorney, Agent, or Firm—Birch, Stewart, Kolasch & Birch

[57] ABSTRACT

A radial tire for heavy duty vehicles, which has a tread provided with blocks defined by a main groove extending in the circumferential direction of the tire and lateral grooves extending from the main groove, wherein each lateral groove is provided with a deep portion one end of which is directly connected with the main groove, and the deep portion is provided with a platform protruding from the base thereof near the main groove, whereby uneven wear of the tread block is effectively diminished without decrease in tire performances such as wet grip, traction and breaking performances.

22 Claims, 6 Drawing Sheets

RADIAL TIRE FOR HEAVY DUTY VEHICLES

The present invention relates to a radial tire for heavy duty vehicles, in which uneven wear of the tread can be effectively diminished without decrease in tire performances such as wet grip, traction and breaking performances.

In order to improve wet grip, traction and the like, the tread of the radial tire for heavy duty vehicles is usually provided with circumferential grooves extending in the circumferential direction of the tire and lateral grooves extending across the circumferential grooves to form blocks.

The tire for heavy duty vehicles provided with the blocks in its tread, however, usually involves a problem of heel and toe wear—uneven wear C in the block B as shown by chain line in FIGS. 9(a) and (b)—which worsens the traction and the appearance of the tire and also largely shortens the tire life.

In such a block, the edge D on the toe side is pushed into the lateral groove when contacting with the ground, and rubbing against the ground surface, it returns to its original position when moving away therefrom. The above mentioned heel and toe wear is caused in this manner.

On the other hand, the amount of wear becomes greater in the corner E of the block B formed between the circumferential groove G and the lateral groove K because of the less rigidity thereof.

Therefore, in order to reduce such uneven wear, it has been adopted to decrease the depth and width of the lateral groove K to thereby suppress the movement of the edge D into the lateral groove K. The dimensional reduction in the lateral groove K, however, impairs its drainage performance or the tire characteristics such as wet grip, traction, breaking performance and the like, and the problem of the unbalance in the amount of wear in the corner E can not be solved.

It is therefore, an object of the present invention to provide a radial tire for heavy duty vehicles, in which the partial wear in the corner of the block is effectively prevented by means of a platform which is formed in the lateral groove near the corner of the block at the specified dimensions and protrudes from the groove base of the lateral groove, without decrease in the tire performances such as wet grip, traction, and breaking performance.

According to one aspect of the present invention, a radial tire for heavy duty vehicles has a tread provided with blocks, wherein
the blocks are defined by a main groove extending in the circumferential direction of the tire and lateral grooves extending from the main groove,
each lateral groove is provided with a deep portion one end of which is directly connected with the main groove,
the deep portion is provided with a platform protruding from the base thereof near the main groove,
the ratio DO/DG of the depth DO of the lateral groove to the depth DG of the main groove is more than 0.7 and less than 1.0,
the ratio DO1/DG of the depth DO1 of the deep portion to the depth DG of the main groove is more than 0.8 and less than 1.0, the ratio D1/DO1 of the height D1 of the platform to the depth DO1 of the deep portion is more than 0.4 and less than 1.0, the ratio W1/WO of the top width W1 of the platform to the open width WO of the lateral groove is more than 0.3 and less than 0.65 in the widthwise direction of the lateral groove, and the ratio L2/L1 of the top width L2 of the platform to the length L1 of the deep portion is more than 0.2 and less than 0.7 in the longitudinal direction thereof.

Preferably, the ratio W2/W1 of the base width W2 of the platform to the top width W1 is more than 0.8 and less than 1.2 in the widthwise direction of the lateral groove, and the ratio L3/L1 of the axial distance L3 between the platform and the main groove to the length L1 of the deep portion is less than 0.4.

An embodiment of the present invention will now be described, by way of example only, in conjunction with the attached drawings, in which.

Figure 1:
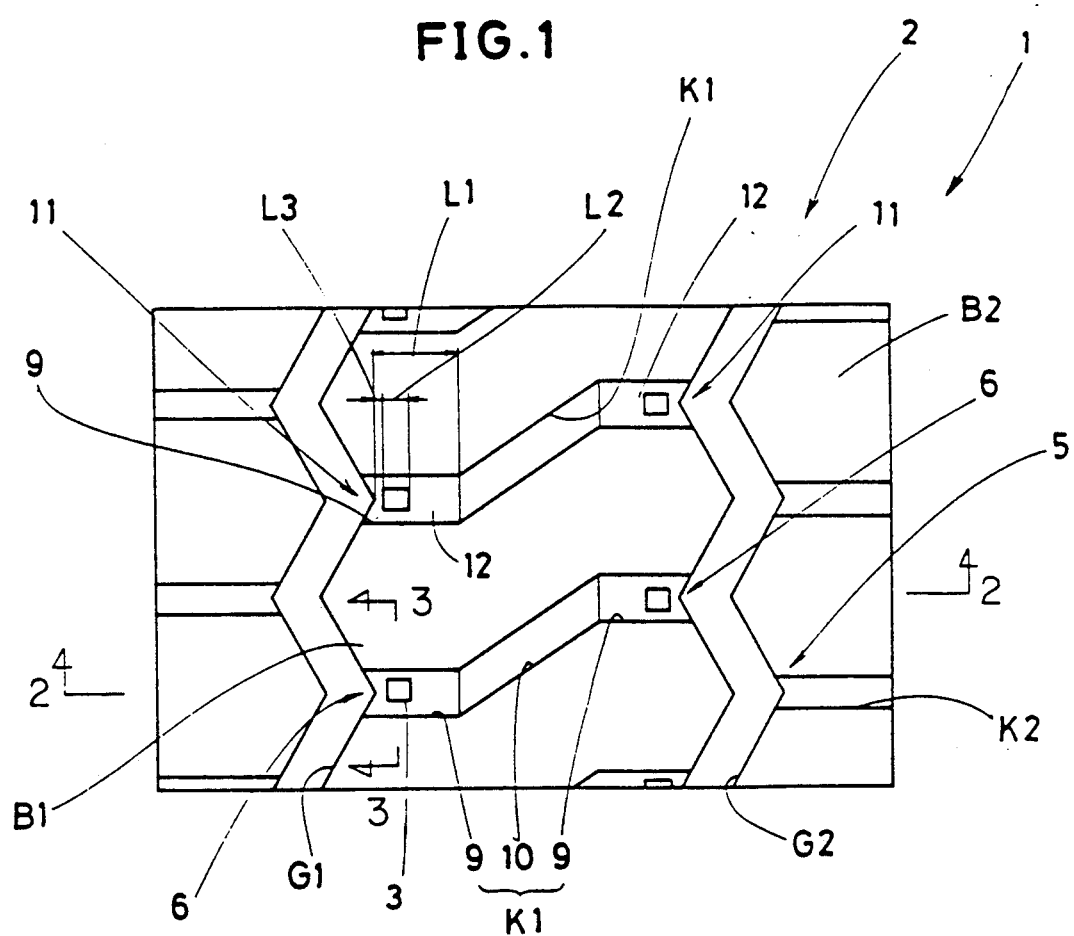
FIG. 1 is a partial plan view showing a tread according to the present invention.
Figure 2:
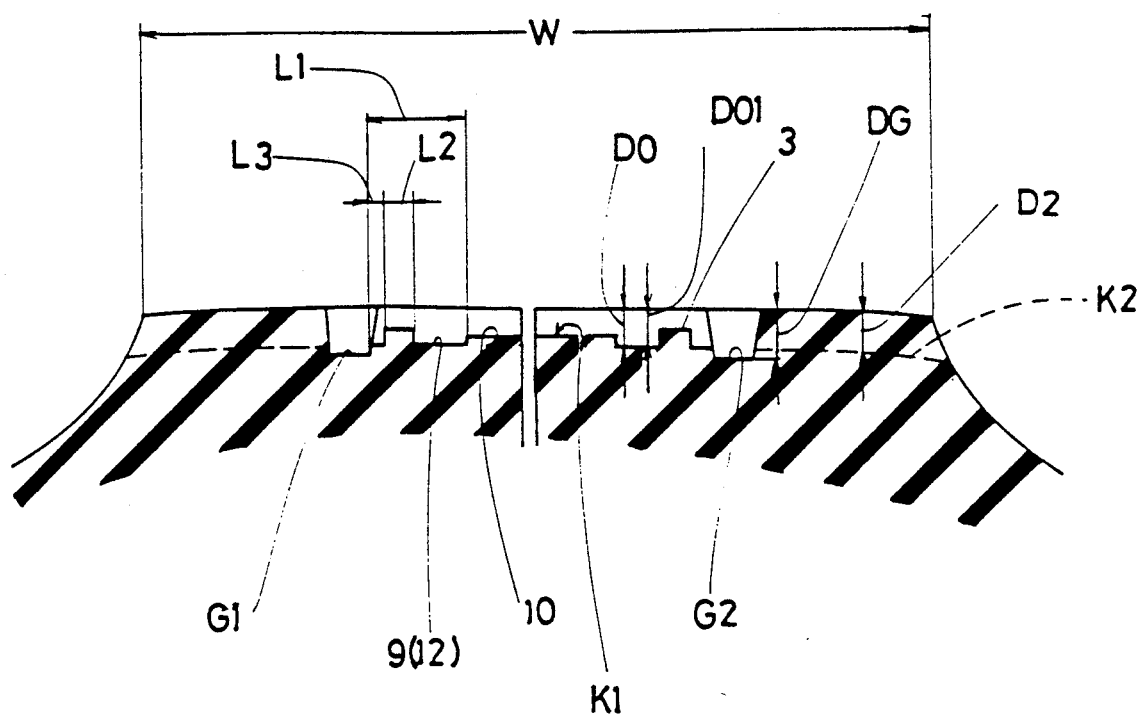
FIG. 2 is a sectional view taken along the line I—I thereof.
Figure 3:
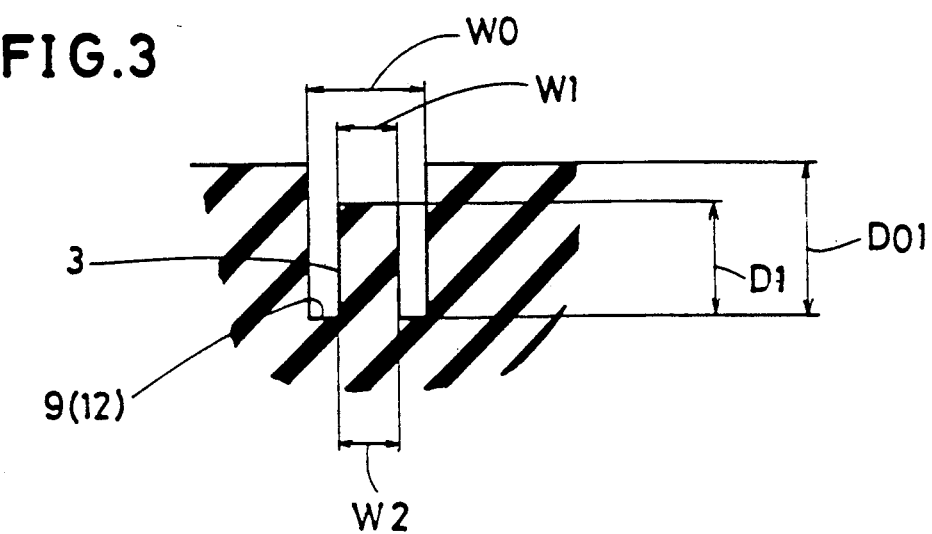
FIG. 3 is a sectional view taken along the line II—II thereof.
Figure 4:
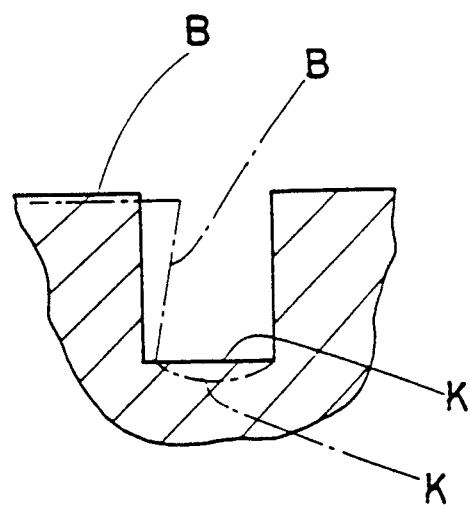
Figure 4:
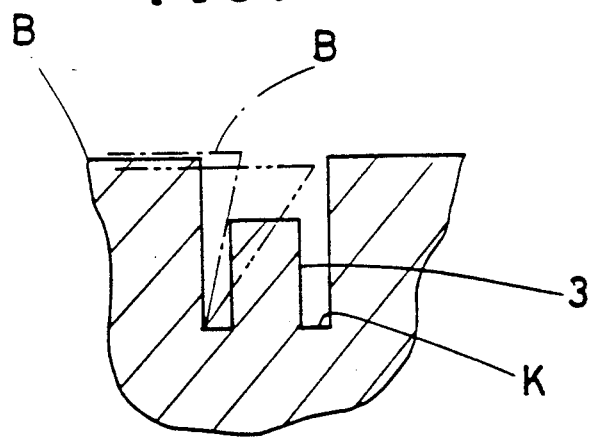
Figure 5:
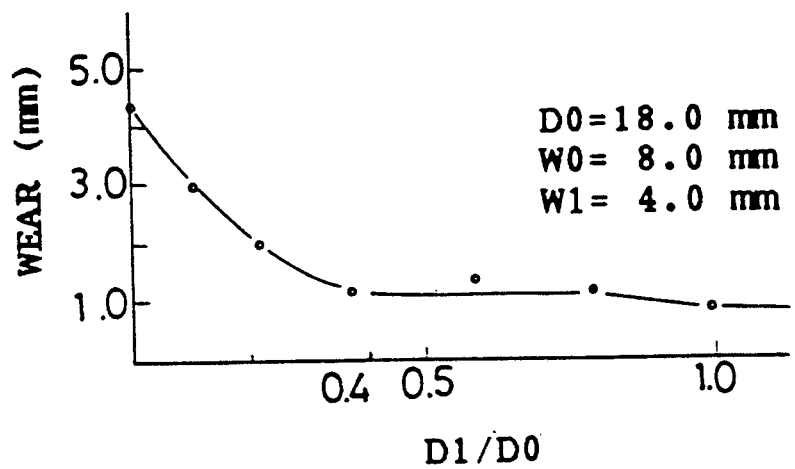
Figure 6:
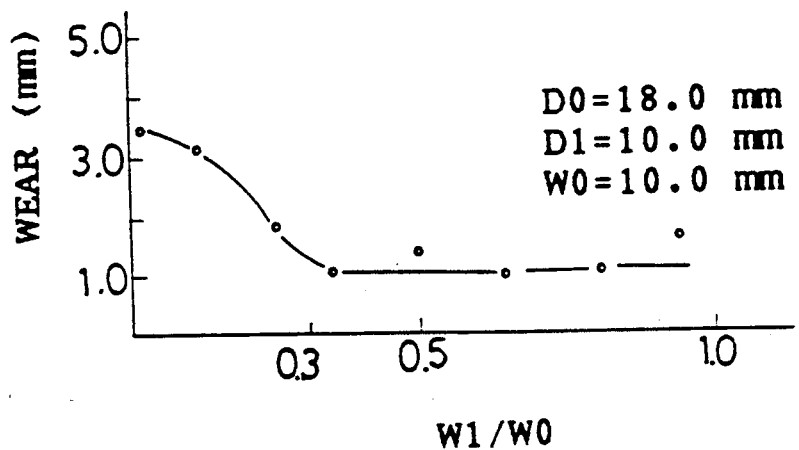
Figure 7:
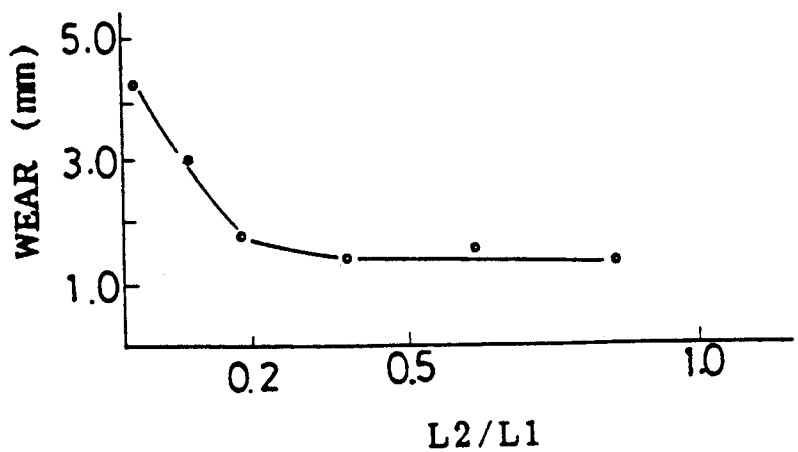
Figure 8:
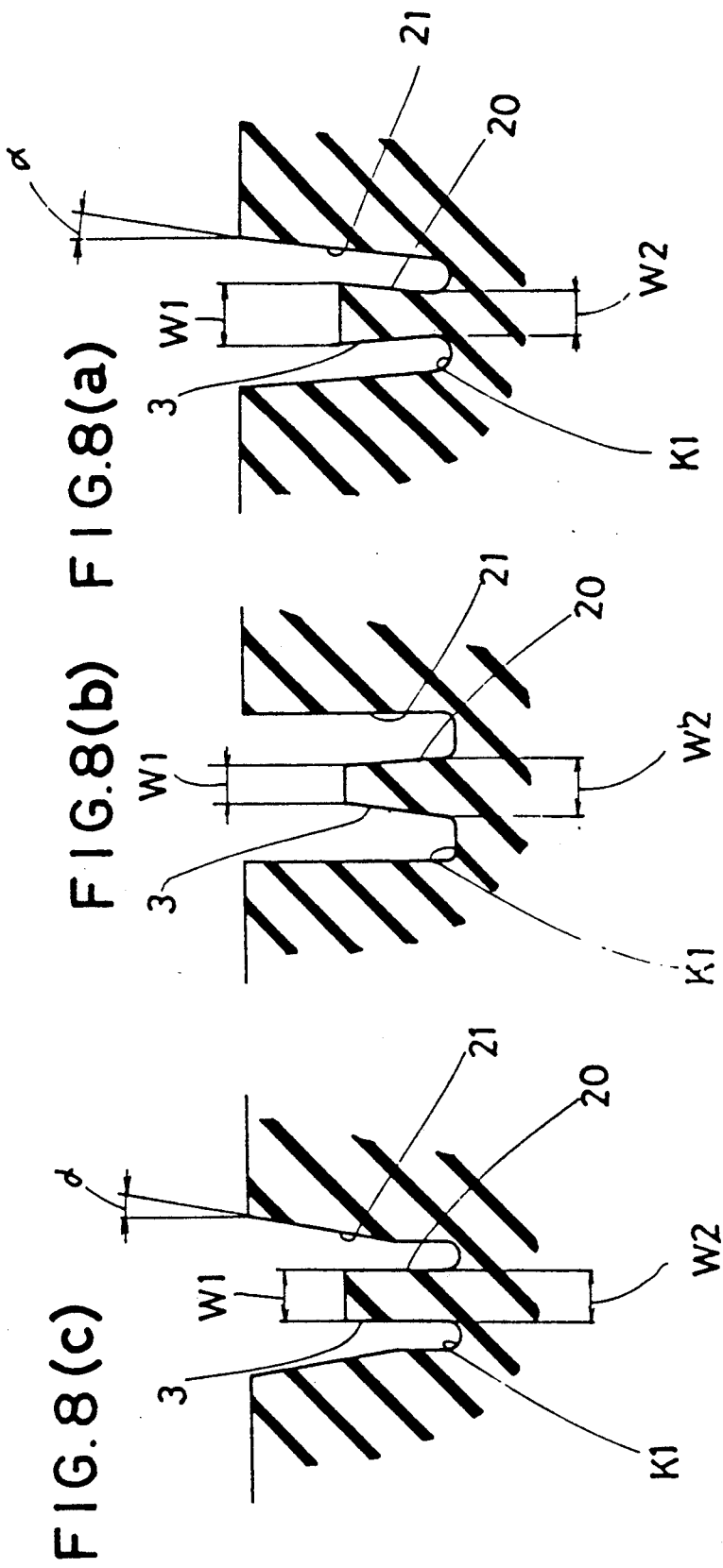
Figure 9:
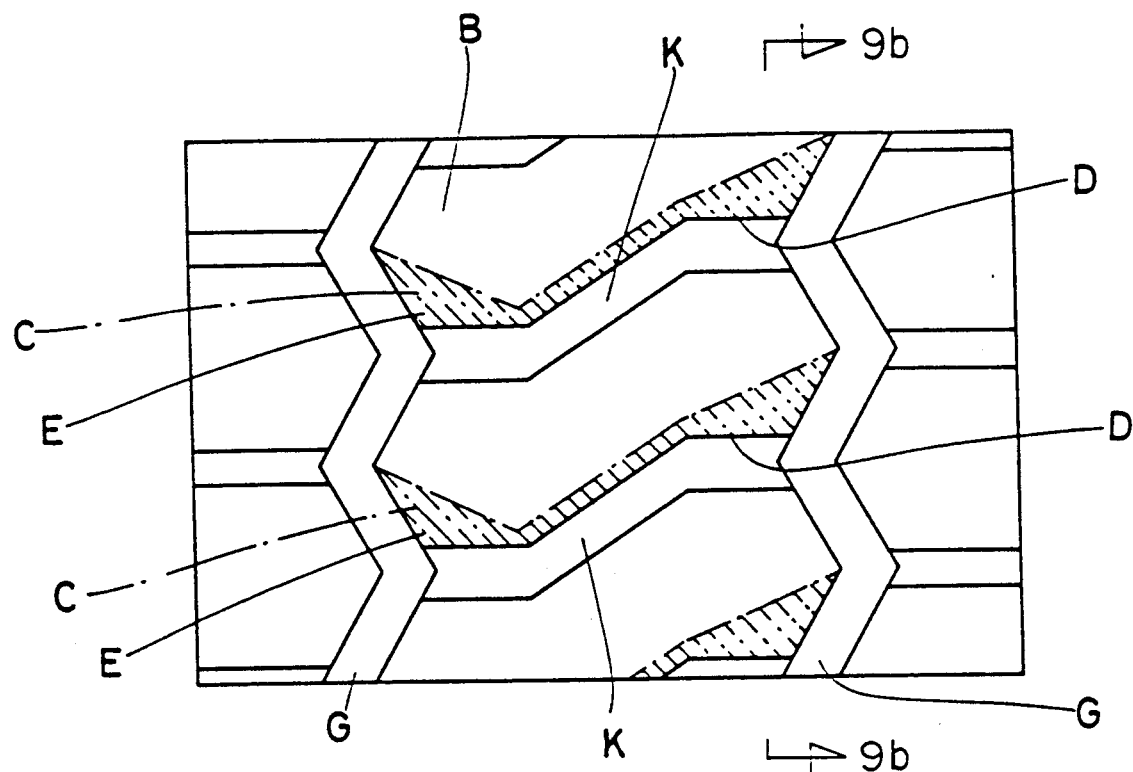
Figure 9:
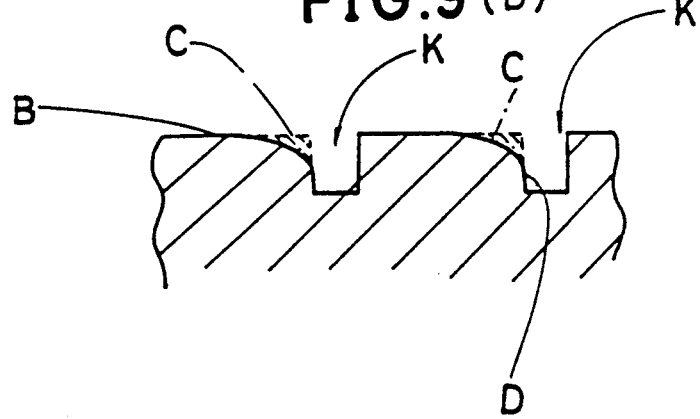

FIGS. 4(a) and 4(b) are sectional views showing the effect of the present invention;

FIG. 5 is a graph showing the relationship between uneven wear and D1/DO1 ratio;

FIG. 6 is a graph showing the relationship between uneven wear and W1/WO ratio;

FIG. 7 is a graph showing the relationship between uneven wear and L2/L1 ratio;

FIGS. 8(a) to (c) are sectional views showing modifications for the lateral groove and platform;

FIG. 9(a) is a plan view of a tread similar to that in FIG. 1 but according to a prior art to explain the uneven wear which will be generated on the block; and FIG. 9(b) is a sectional view taken along the line III—III thereof.

In the drawings, the radial tire 1 for heavy duty vehicles is provided in the tread 2 with
two main grooves G1 and G2 extending zigzag in the circumferential direction of the tire,
inner lateral grooves K1 extending from one of the main grooves to the other,
outer lateral grooves K2 extending from the main grooves to the respective shoulder edge,
thereby defining a row of inner blocks B1 between the two main grooves and two rows of outer blocks B2 one on each side thereof.

In this embodiment, platforms 3 are provided in only the inner lateral grooves K1 to prevent the inner blocks B1 from uneven wear.

The main grooves G1 and G2 are arranged at the same zigzag pitches, that is, they are extended parallel with each other.

The above-mentioned outer lateral grooves K2 are extended one from each of the axially outwardly protruding angled portions 5 of the main groove.

On the contrary, the inner lateral grooves K1 are extended from the axially inwardly protruding angled portions 6 of the main groove G1 to those of the main groove G2.

In this embodiment, each inner lateral groove K1 is a zigzag groove composed of two axial segments 9 and a slanting segment 10 disposed therebetween.

Each axial segment 9 is extended axially inwardly from the angled portion 6 in parallel with the axial direction of the tire. The slanting segment 10 is extended between the inner ends of the axial segments 9 at a slanting angle to connect them each other.

The ratio DO/DG of the groove depth DO of the slanting segment 10 to the groove depth DG of the main groove is more than 0.7 and less than 1.0, and the ratio DO1/DG of the groove depth DO1 of the axial segment 9 to the groove depth DG of the main groove is more than 0.8 and less than 1.0, whereby the tire performances such as wet grip, traction, braking performance can be improved.

Further, in this embodiment, the axial segments 9 are deeper than the slanting segment 10, and the platforms 3 are formed immediately inside the main groove in those deep portions 12 of the lateral groove K1.

The axial segments 9 and the slanting segment 10 may be formed in the same groove depth as long as it is within the range of 80 to 100% of the groove depth DG of the main groove. In this case, the inner lateral groove K1 as a whole should be considered as the deep portion 12.

Thus the platform is provided in the deep portion which is defined by having specified dimensions. Accordingly, the drainage between the main groove and the lateral groove is not deteriorated, and the tire performances are maintained.

Furthermore, in this embodiment, the ratio D2/DG of the groove depth D2 of the above-mentioned lateral groove K2 to the main groove depth DG is set to be more than 0.7 and less than 1.0.

The above-mentioned platform 3 is a substantially cubical block projecting from the base of the deep portion 12 not touching the groove sidewalls.

The arrangement of this platform 3 increases the rigidity of the lateral groove K1 in its base portion near the connecting area 11. Accordingly, the movement of the block B toward the lateral groove K, occurred by the flexure of the groove base in a prior art as shown in FIG. 4(a), is prevented.

Further, the direct contact of the platform 3 with the block B as shown in FIG. 4(b), also control the movement of the block, accordingly which can effectively prevent the block corners from uneven wear in combination with the above-mentioned reinforcement to the groove base.

Furthermore, the reduction in movement of the corners of the block ends is also effective on diminishing in the wear of the block as a whole.

Each platform 3 is constructed so that: the ratio D1/DO1 of the height D1 of the platform to the groove depth DO1 of the deep portion 12 is more than 0.4 and less than 1;

the ratio W1/WO of the top width W1 of the platform 3 to the open width WO of the lateral groove K1, in the circumferential direction of the tire, is more than 0.3 and less than 0.65; and the ratio L2/L1 of the top width L2 of the platform 3 to the groove length L1 of the deep portion 12, in the axial direction of the tire, is more than 0.2 and less than 0.7.

Those ratios defining the platform dimensions were determined through the study of the results of various tests on uneven wear and wet grip.

FIG. 5, FIG. 6 and FIG. 7 typically show the relationship between uneven wear and D1/DO1 ratio, one between uneven wear and W1/WO ratio, and one between uneven wear and L2/L1 ratio, respectively.

As apparent from FIGS. 5, 6 and 7, when the ratios, D1/DO1, W1/WO and L2/L1 were more than 0.4, 0.3 and 0.2 respectively, the platforms shown, excellent effects to control uneven wear. On the other hand, when the rations were less than the above, the platforms had less effect. Further, when the ratios, W1/WO and L2/L1 were more than 0.65 and 0.7 respectively, the wet grip performance was deteriorated by the interfered drainage between the main groove and the lateral groove.

Further, the ratio W2/W1 of the base width W2 of the platform to the top width W1 thereof, in the circumferential direction of the tire, is preferably set to be more than 0.8 and less than 1.2 to maintain or enhance the rigidity of the platform without deteriorating the drainage.

When W2/W1 is less than 0.8, the rigidity of the base portion of the platform is insufficient for preventing it from being torn off, and resisting its falling down movement, and further for reinforcing the groove base. Therefore, the effect to control the uneven wear is decreased.

On the other hand, when it is over 1.2, the platform decreases the drainage, and the wet grip performance becomes decreased.

Furthermore, the ratio L3/L1 of the distance L3 from the main groove to the platform to the groove length L1 of the deep portion 12, in the axial direction of the tire, is less than 0.4. By disposing the platform at such position, the platform becomes most effective to control the uneven wear.

Preferably, the distance L3 is set to be less than 3% of the tread width W.

FIGS. 8(a) to (c) are sectional views each showing a modification for the platform and lateral groove. As shown therein, as far as the ratio W2/W1 is set in the range between 0.8 and 1.2 as explained above, the sides 20 of the platform can be formed in such that: the sides are inclined to make the platform thick or thin toward its top; and the sides extend parallel with the normal direction to the tread face.

Preferably, the sides of the platform are connected to the groove base by round face, that is, the face from the root of the platform to the groove base is rounded.

As to the lateral groove, the groove wall 21 can be inclined to become narrow toward the groove bottom, and also it can be formed parallel with the normal direction. Further, the groove wall can be inclined partly in only a upper region near the groove opening. The inclination of the groove wall is preferably set at an angle $\alpha$ being less than 15 degrees with respect to the normal direction.

Further, the tread can be provided with more than two main grooves of a zigzag or straight configuration, and the platform may be formed in the above-mentioned outer lateral groove K2, too.

I claim:

1. A radial tire for heavy duty vehicles having a tread provided with blocks, the blocks being defined by main grooves extending in the circumferential direction of the tire and lateral grooves extending between the main grooves, each lateral groove provided between a main portion thereof and said main grooves with a deep portion one end of which is directly connected with the main groove, and which has a depth DO1 deeper than the depth DO of the main portion, the deep portion being provided with a platform protruding from the base thereof near the main groove, the ratio DO/DG of the depth DO of the lateral groove main portion to the depth DG of the main groove being more than 0.7 and less than 1.0, the ratio DO1/DG of the depth DO1 of the deep portion to the depth DG of the main groove being more than 0.8 and less than 1.0, the ratio D1/DO1 of the height D1 of the platform to the depth DO1 of the deep portion being more than 0.4 and less than 1.0, the ratio W1/WO of the top width W1 of the platform to the open width WO of the lateral groove being more than 0.3 and less than 0.65 in the widthwise direction of the lateral groove, and the ratio L2/L1 of the top length L2 of the platform to the length L1 of the deep portion being more than 0.2 and less than 0.7 in the longitudinal direction of the lateral groove.

2. The radial tire as set forth in claim 1 wherein the ratio W2/W1 of the base width W2 of the platform to the top width W1 is more than 0.8 and less than 1.2 in the widthwise direction of the lateral groove.

3. The radial tire as set forth in claim 1 wherein the ratio L3/L1 of the axial distance L3 between the platform and the main groove to the length L1 of the deep portion is less than 0.4.

4. The radial tire as set forth in claim 1 wherein the main groove extends straight in the circumferential direction of the tire.

5. The radial tire as set forth in claim 1 wherein the main groove extends in a zigzag manner in the circumferential direction of the tire.

6. The radial tire as set forth in claim 2 wherein the ratio L3/L1 of the axial distance L3 between the platform and the main groove to the length L1 of the deep portion is less than 0.4.

7. The radial tire as set forth in claim 2 wherein the main groove extends straight in the circumferential direction of the tire.

8. The radial tire as set forth in claim 3 wherein the main groove extends straight in the circumferential direction of the tire.

9. The radial tire as set forth in claim 6 wherein the main groove extends straight in the circumferential direction of the tire.

10. The radial tire as set forth in claim 2 wherein the main groove extends in a zigzag manner in the circumferential direction of the tire.

11. The radial tire as set forth in claim 3 wherein the main groove extends in a zigzag manner in the circumferential direction of the tire.

12. The radial tire as set forth in claim 6 wherein the main groove extends in a zigzag manner in the circumferential direction of the tire.

13. The radial tire as set forth in claim 3 wherein the axial distance L3 is less than 3% of the tread width.

14. The radial tire as set forth in claim 1 wherein the sides of the platform are inclined so as to make the top of the platform narrower than its base.

15. The radial tire as set forth in claim 1 wherein the sides of the platform extend parallel with the normal direction to the tread face.

16. The radial tire as set forth in claim 1 wherein the face between the base of the platform and the base of the lateral groove is rounded.

17. The radial tire as set forth in claim 1 wherein the groove wall of the lateral groove is inclined so that the base of the lateral groove is narrower than the top thereof.

18. The radial tire as set forth in claim 1 wherein only an upper region of the groove wall of the lateral groove is inclined so that the base of the lateral groove is narrower than the top thereof.

19. The radial tire as set forth in claim 17 wherein the groove wall of the lateral groove is inclined at an angle of less than 15 degrees with respect to the normal direction to the tread face.

20. The radial tire as set forth in claim 18 wherein the upper region of the groove wall of the lateral groove is inclined at an angle of less than 15 degrees with respect to the normal direction to the tread face.

21. The radial tire as set forth in claim 1 wherein said tread further includes outer lateral grooves extending from the main grooves to the outer circumferential edge of the tire.

22. The radial tire as set forth in claim 21 wherein said outer lateral grooves further include a platform extending from the base thereof.

* * * * *